(12) United States Patent
Tanigawa et al.

(10) Patent No.: US 9,067,756 B2
(45) Date of Patent: Jun. 30, 2015

(54) FILAMENT WINDING APPARATUS

(75) Inventors: Motohiro Tanigawa, Kyoto (JP); Tadashi Uozumi, Kyoto (JP); Daigoro Nakamura, Kyoto (JP); Ken Hatta, Toyota (JP)

(73) Assignees: MURATA MACHINERY, LTD., Kyoto (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 141 days.

(21) Appl. No.: 13/876,154

(22) PCT Filed: Sep. 21, 2011

(86) PCT No.: PCT/JP2011/071533
§ 371 (c)(1),
(2), (4) Date: Mar. 26, 2013

(87) PCT Pub. No.: WO2012/043344
PCT Pub. Date: Apr. 5, 2012

(65) Prior Publication Data
US 2013/0193255 A1 Aug. 1, 2013

(30) Foreign Application Priority Data

Sep. 28, 2010 (JP) ................................ 2010-217331

(51) Int. Cl.
  *B65H 54/64* (2006.01)
  *B65H 57/00* (2006.01)
  (Continued)

(52) U.S. Cl.
  CPC .............. *B65H 57/00* (2013.01); *B29C 53/602* (2013.01); *B29C 53/8016* (2013.01); *B29C 70/32* (2013.01)

(58) Field of Classification Search
  USPC ................ 242/437, 437.3, 438, 438.1, 439.2, 242/439.5, 441.2, 443.1, 444, 444.3, 444.4, 242/447.1
  See application file for complete search history.

(56) References Cited

U.S. PATENT DOCUMENTS 3,701,489 A * 10/1972 Goldsworthy et al. .... 242/437.2
6,601,793 B2 * 8/2003 Yasui et al. ................. 242/472.8
(Continued)

FOREIGN PATENT DOCUMENTS

EP  2 060 384 A1  5/2009
EP  2 060 385 A2  5/2009
(Continued)

OTHER PUBLICATIONS

English language translation of international preliminary report on patentability dated Apr. 16, 2013 issued in corresponding PCT application PCT/JP2011/071533 lists the foreign patent document listed above.

(Continued)

*Primary Examiner* — Emmanuel M Marcelo
(74) *Attorney, Agent, or Firm* — DLA Piper LLP (US)

(57) ABSTRACT

A filament winding apparatus prevents a fiber bundle supplied to a liner from interfering with other fiber bundles and fiber supplying guides. First and second guide units include a plurality of fiber supplying guides arranged radially and extending and contracting in a direction approximately perpendicular to a liner central axis. When a fiber bundle supplied from a first supplying guide of the first guide unit crosses between a second supplying guide of the second guide unit and the liner, the distance from the second supplying guide to the liner central axis is made larger than the distance from the first supplying guide to the liner central axis, and in the reverse case, the distance from the first supplying guide to the liner central axis is made larger than the distance from the second supplying guide to the liner central axis.

6 Claims, 9 Drawing Sheets

(51) Int. Cl.
*B29C 53/80* (2006.01)
*B29C 70/32* (2006.01)
*B29C 53/60* (2006.01)

(56) References Cited

U.S. PATENT DOCUMENTS

| | | | |
|---|---|---|---|
| 6,622,954 B2 * | 9/2003 | Komuro et al. | 242/432.2 |
| 7,300,014 B2 * | 11/2007 | Allen | 242/439.5 |
| 7,614,579 B2 * | 11/2009 | Asano | 242/439.1 |
| 7,815,141 B2 * | 10/2010 | Uozumi et al. | 242/445.1 |
| 2009/0127373 A1 | 5/2009 | Uozumi et al. | 242/436 |
| 2010/0032510 A1 | 2/2010 | Tanigawa et al. | 242/430 |

FOREIGN PATENT DOCUMENTS

| | | |
|---|---|---|
| EP | 2 151 311 A1 | 2/2010 |
| GB | 1 150 131 A | 4/1969 |
| JP | 2009-119732 | 6/2009 |
| JP | 2010-005831 | 1/2010 |
| JP | 2010005831 A | 1/2010 |
| JP | 2010-036461 | 2/2010 |

OTHER PUBLICATIONS

Extended European search report dated Apr. 7, 2015 for corresponding European application 11828901.6.

* cited by examiner

FILAMENT WINDING APPARATUS

CROSS REFERNCE TO RELATED APPLICATION

This application is a national stage of international application PCT/JP2011/071533, filed on Sept. 21, 2011, and claims the benefit of priority under 35 USC 119 of Japanese application 2010-217331, filed on Sept. 28, 2010, which are incorporated herein by reference.

TECHNICAL FIELD

The present invention relates to a filament winding apparatus.

BACKGROUND ART

A filament winding apparatus has been known that includes a hoop winding device and a helical winding device, and that is configured to wind fiber bundles around the liner by performing hoop winding and helical winding alternately and repeatedly on a liner, thereby forming a reinforcement layer.

In the helical winding, the position of the helical winding device is fixed, and fiber bundles are wound around the liner by moving the liner in the direction of a rotation axis while the liner is rotated. The fiber bundles are supplied to the liner from fiber supplying guides disposed in the helical winding device. A filament winding apparatus has been also known that includes a first guide unit and a second guide unit, each of which includes a plurality of fiber supplying guides disposed radially, and thus can simultaneously wind a plurality of fiber bundles (for example, Patent Document 1).

RELATED ART DOCUMENT

Patent Document

[Patent Document 1] Japanese Unexamined Patent Application Publication No. 2010-36461.

DISCLOSURE OF THE INVENTION

Problems to be Solved by the Invention

In the helical winding, a fiber bundle is drawn out while being inclined with respect to the conveyance direction of a liner from a fiber supplying guide. In the helical winding, since a fiber bundle is drawn out and wound around the liner conveyed in a direction of the rotation axis, the winding position of the fiber bundle on the liner is more on a front side than the fiber supplying guide in the conveyance direction of the liner.

Therefore, in the helical device including the first guide unit and the second guide unit, for example, a fiber bundle supplied from a fiber supplying guide of the first guide unit might cross between a fiber supplying guide of the second guide unit and the liner depending on the conveyance direction of the liner. Specifically, the fiber bundle supplied from the fiber supplying guide of the first guide unit is drawn out obliquely toward a fiber supplying guide side of the second guide unit, and thus the fiber bundle supplied from the fiber supplying guide of the first guide unit passes through a virtual plane that passes through the distal end of each of the fiber supplying guides of the second guide unit and is perpendicular to the central axis of the liner.

Furthermore, when the conveyance direction of the liner is switched, conversely a fiber bundle supplied from a fiber supplying guide of the second guide unit might cross between the fiber supplying guide of the first guide unit and the liner. Specifically, the fiber bundle supplied from the fiber supplying guide of the second guide unit is drawn out obliquely toward a fiber supplying guide side of the first guide unit, and thus the fiber bundle supplied from the fiber supplying guide of the second guide unit passes through a virtual plane that passes through the distal end of each of the fiber supplying guides of the first guide unit and is perpendicular to the central axis of the liner.

In such a case, for example, if the fiber bundle supplied from the fiber supplying guide of the first guide unit interferes with the fiber supplying guides of the second guide unit and fiber bundles supplied from the second guide unit, there is a problem that a damaged portion, such as fiber breakage, may be formed on the fiber bundle and thus the strength of a reinforcement layer formed around the liner degrades.

SUMMARY OF THE INVENTION

The present invention is made to solve the above-mentioned problems. An object of the present invention is to provide a filament winding apparatus that prevents a fiber bundle from interfering with other fiber bundles and fiber supplying guides when fiber bundles are supplied to a liner.

Means of Solving the Problems

The problems to be solved by the present invention are described in the above. Next, means for solving the problems will be described.

A first invention is a filament winding apparatus that winds a fiber bundle around a liner, and includes a first guide unit and a second guide unit, a driving unit, and a controller. Each of the first guide unit and the second guide unit includes a plurality of fiber supplying guides, each of which is arranged radially and extend and contract in a direction approximately perpendicular to a rotation axis of the liner. The driving unit is configured to change an amount of extension or contraction of the fiber supplying guides. The controller is configured to adjust the distance between the fiber supplying guides and a central axis of the liner by controlling the driving unit. When a fiber bundle supplied from the fiber supplying guide of the first guide unit crosses between the fiber supplying guide of the second guide unit and the liner, the controller makes the distance from the fiber supplying guide of the second guide unit to the central axis of the liner larger than the distance from the fiber supplying guide of the first guide unit to the central axis of the liner. Furthermore, when a fiber bundle supplied from the fiber supplying guide of the second guide unit crosses between the fiber supplying guide of the first guide unit and the liner, the controller makes the distance from the fiber supplying guide of the first guide unit to the central axis of the liner larger than the distance from the fiber supplying guide of the second guide unit to the central axis of the liner.

Here, "when a fiber bundle supplied from the fiber supplying guide of the first guide unit crosses between the fiber supplying guide of the second guide unit and the liner" refers to a case where a fiber bundle supplied from the fiber supplying guide of the first guide unit is drawn out obliquely to each fiber supplying guide side of the second guide unit, and this leads to the state where the fiber bundle supplied from the fiber supplying guide of the first guide unit passes through a virtual plane that passes through the distal end of the fiber supplying guide of the second guide unit and is perpendicular to the central axis of the liner.

"When a fiber bundle supplied from the fiber supplying guide of the second guide unit crosses between the fiber supplying guides of the first guide unit and the liner" refers to a case where a fiber bundle supplied from the fiber supplying guide of the second guide unit is drawn out obliquely to the fiber supplying guide side of the first guide unit, and this leads to the state where the fiber bundle supplied from the fiber supplying guide of the second guide unit passes through a virtual plane that passes through the distal end of each fiber supplying guide of the first guide unit and is perpendicular to the central axis of the liner.

"The distance from the fiber supplying guide to the central axis of the liner" refers to the distance from the distal end of the fiber supplying guide to the central axis of the liner.

The second invention is the first invention in which the controller may adjust the distance between the fiber supplying guide of the first guide unit and the second guide unit and the central axis of the liner while maintaining the difference between the distance from the fiber supplying guide of the first guide unit to the central axis of the liner and the distance from the fiber supplying guide of the second guide unit to the central axis of the liner.

The third invention is the first invention or the second invention in which after switching the winding direction of the fiber bundle relative to a direction of the central axis of the liner, the controller may perform a switching operation to switch the large-small relationship between the distance from the fiber supplying guide of the first guide unit to the central axis of the liner and the distance from the fiber supplying guide of the second guide unit to the central axis of the liner, in such a way that the distance from the fiber supplying guide of one of the first guide unit and the second guide unit located more on a rear side in the winding direction to the central axis of the liner becomes larger than the distance from the fiber supplying guide of one of the first guide unit and the second guide unit located more on a front side in the winding direction to the central axis of the liner.

The fourth invention is the third invention in which the controller may perform the switching operation after the winding position of the fiber bundle wound around the liner changes from the front side to the rear side in the position of the fiber supplying guide of each of the first guide unit and the second guide unit in the winding direction of the fiber bundle.

The fifth invention is the third invention or the fourth invention in which the liner may be assumed to include a tubular portion with a constant radius and dome portions disposed respectively on both ends of the tubular portion, and the controller may perform the switching operation before the winding of the fiber bundle around the tubular portion is started.

The sixth invention is the fifth invention in which when the switching operation may be performed while the fiber bundle is wound around the dome portion, the controller may perform the switching operation after the winding of the fiber bundle around the dome portion has been halfway completed or more.

Effects of The Invention

As the effect of the present invention, the following effects are obtained.

According to the first invention, when a fiber bundle supplied from the fiber supplying guide of the first guide unit crosses between the fiber supplying guide of the second guide unit and the liner, the distance from the fiber supplying guide of the second guide unit to the central axis of the liner is made larger than the distance from the fiber supplying guide of the first guide unit to the central axis of the liner, and when a fiber bundle supplied from the fiber supplying guide of the second guide unit crosses between the fiber supplying guide of the first guide unit and the liner, the distance from the fiber supplying guide of the first guide unit to the central axis of the liner is made larger than the distance from the fiber supplying guide of the second guide unit to the central axis of the liner. Accordingly, the fiber bundle can be prevented from interfering with the other fiber bundles and fiber supplying guides.

According to the second invention, the distance between the fiber supplying guide of each of the first guide unit and the second guide unit and the central axis of the liner is adjusted while the difference between the distance from the fiber supplying guide of the first guide unit to the central axis of the liner and the distance from the fiber supplying guide of the second guide unit to the central axis of the liner is maintained. Accordingly, in the case where the radius of the liner differs between the central portion and the both end portions, for example, a fiber bundle can be wound with the fiber supplying guide of each of the first guide unit and the second guide unit moving along the outer peripheral surface of the liner. Thus, the fiber bundles can be wound uniformly on the entire body of the liner while preventing the interference of the fiber bundles.

According to the third invention, after switching the winding direction of the fiber bundle relative to the direction of the central axis of the liner, the controller performs a switching operation to switch the large-small relationship between the distance from the fiber supplying guide of the first guide unit to the central axis of the liner and the distance from the fiber supplying guide of the second guide unit to the central axis of the liner in such manner that, the distance from the fiber supplying guide of one of the first guide unit and the second guide unit located more on a rear side in the winding direction to the central axis of the liner becomes larger than the distance from the fiber supplying guide of one of the first guide unit and the second guide unit located more on a front side in the winding direction to the central axis of the liner. Accordingly, in the case where the winding direction of the fiber bundle is switched relative to the direction of the central axis of the liner, a fiber bundle can be prevented from interfering with other fiber bundles and fiber supplying guides.

According to the fourth invention, the controller performs the switching operation after the winding position of the fiber bundle wound around the liner changes from the front side to the rear side relative to the fiber supplying guide of each of the first guide unit and the second guide unit in the winding direction of the fiber bundle. Accordingly, the switching operation can be performed at a proper timing, and a fiber bundle can be prevented from interfering with other fiber bundles and fiber supplying guides.

According to the fifth invention, the controller performs the switching operation before the winding of the fiber bundle around a tubular portion is started. Accordingly, the control to wind a fiber bundle at an equal pitch on the tubular portion can be easily performed.

According to the sixth invention, when the switching operation is performed while the fiber bundle is wound around the dome portion, the controller performs the switching operation after the winding of the fiber bundle on the dome portion has been halfway completed or more. Accordingly, the winding position of the fiber bundle on the dome portion can be controlled with an amount of extension or contraction of each of the fiber supplying guides.

BEST MODE FOR CARRYING OUT THE INVENTION

Next, an embodiment of the invention will be described with reference to the drawings.

[Embodiment 1]

First, the entire configuration of a filament winding apparatus 100 according to Embodiment 1 of the present invention will be described with reference to FIG. 1. Hereafter, the filament winding apparatus 100 is described while being abbreviated to the FW apparatus 100.

Figure 1:
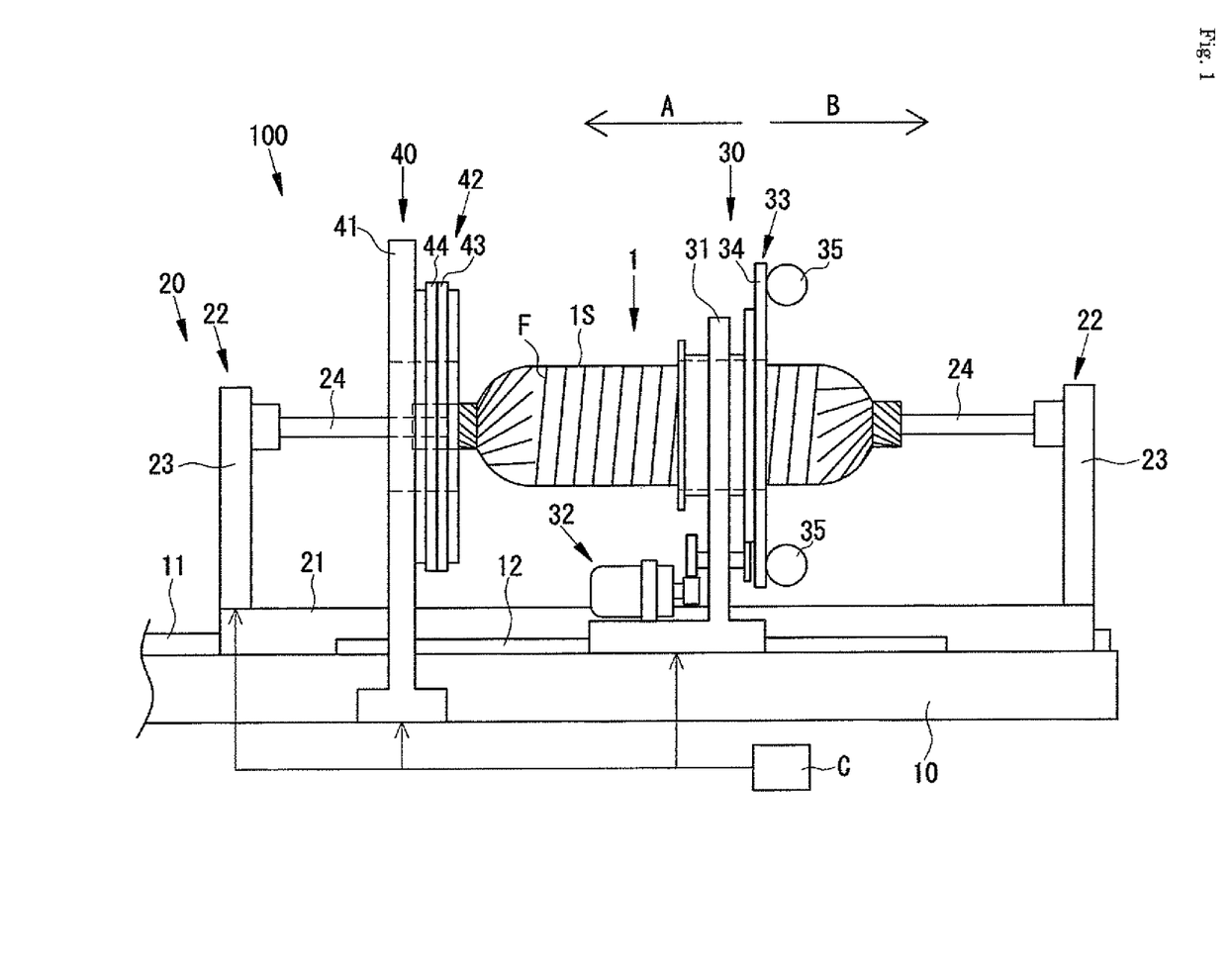
FIG. 1 is a diagram illustrating a FW apparatus 100 according to an embodiment of the present invention.

FIG. 1 is a side view of the FW apparatus 100. The FW apparatus 100 is an apparatus that winds a fiber bundle F around the periphery of a liner 1 by performing hoop winding and helical winding alternately and repeatedly on the liner 1.

Arrows A and B shown in FIG. 1 indicate the front-rear direction of the FW apparatus 100 and the conveyance direction of the liner 1 in the helical winding. In the helical winding, in order to make the liner 1 reciprocate in the front-rear direction of the FW apparatus 100, the liner 1 is conveyed in the direction indicated by the arrow A and conveyed in the direction indicated by the arrow B. In the following description, the front side in the direction to which the liner 1 is conveyed is defined as the front side of each of the liner 1 and the FW apparatus 100, and the other direction is defined as the rear side. That is the front side and the rear side of the FW apparatus 100 are switched depending on the conveyance direction of the liner 1. When the liner 1 is conveyed in the direction indicated by the arrow A, the left side in FIG. 1 is defined as the front side of each of the liner 1 and the filament winding apparatus. Furthermore, when the conveyance direction of the liner 1 is switched, and thus the liner 1 is conveyed in the direction indicated by the arrow B, the right side in FIG. 1 is defined as the front side of each of the liner 1 and the filament winding apparatus.

The liner 1 is an approximately-tubular hollow container made of, for example, a high-strength aluminum material or a polyamide type resin. Through winding of fiber bundles F around an outer peripheral surface 1S of the liner 1, the pressure resistant property of the liner 1 can be improved. Thus, the liner 1 serves as a base member forming a pressure resistant container.

The FW apparatus 100 mainly includes a main base 10, a liner conveyance device 20, a hoop winding device 30, a helical winding device 40, and a controller C. The main base 10 constructs the foundation of the FW apparatus 100. The main base 10 is provided with, on an upper portion, a liner conveyance device rail 11. On the liner conveyance device rail 11, the liner conveyance device 20 is mounted. At the upper portion of the main base 10, a hoop winding device rail 12 is disposed in parallel to the liner conveyance device rail 11. On the hoop winding device rail 12, the hoop winding device 30 is mounted. With this configuration, the liner conveyance device 20 and the hoop winding device 30 are movable relative to the main base 10. The helical winding device 40 is secured to the main base 10.

The liner conveyance device 20 makes the liner 1 rotate and conveys the liner 1 in the front-rear direction of the FW apparatus 100 with a rotation axis in a direction along the front-rear direction of the FW apparatus 100 matching a central axis Ra (refer to FIG. 2) of the liner 1. The liner conveyance device 20 mainly includes a base 21 and a liner supporting section 22. The actuation of the liner conveyance device 20 is controlled by the controller C.

The base 21 includes a pair of liner supporting sections 22. Each of the liner supporting sections 22 includes a liner supporting frame 23 and a supporting shaft 24. The liner supporting frame 23 extends upward from the base 21. The supporting shaft 24 extends from the liner supporting frame 23 along the front-rear direction of the FW apparatus. The supporting shaft 24 is rotated in one direction about its axis by a driving mechanism (not-shown). The supporting shafts 24 respectively support both ends of the liner 1 so as to rotate the liner 1. With this configuration, the liner conveyance device 20 makes the liner 1 rotate via the supporting shafts 24 serving as a rotating shaft, and conveys the liner 1 in the front-rear direction of the FW apparatus 100.

The hoop winding device 30 winds a fiber bundle F in hoop winding around the outer peripheral surface 1S of the liner 1. In the hoop winding, the fiber bundle F is wound around the peripheral surface 1S of the liner 1 with a winding angle WA of the fiber bundle F (hereafter, merely referred to as "winding angle WA", refer to FIG. 2) with respect to the central axis of the liner 1 being approximately 90 degrees. The hoop winding device 30 mainly includes a base 31, a power mechanism 32, and a hoop winding support device 33. The actuation of the hoop winding device 30 is controlled by the controller C.

On the base 31, the power mechanism 32 and the hoop winding support device 33 are mounted. The hoop winding support device 33 includes a winding support table 34 and a bobbin 35. At the center of the winding support table 34, a space through which the liner 1 is inserted is provided. The bobbin 35 is disposed on the winding support table 34, and configured to supply a fiber bundle F to the outer peripheral surface is of a liner 1. The power mechanism 32 is configured to make the hoop winding support device 33 rotate about the central axis of the liner 1.

In the hoop winding, the position of the liner 1 is fixed, and the hoop winding support device 33 is rotated about the central axis of the liner 1 while the hoop winding device 30 moves along a direction of the central axis of the liner 1. Thus, the hoop winding is performed. It is to be noted that, by adjusting the moving speed of the hoop winding device 30 and the rotating speed of the winding support table 34, the winding form of the fiber bundles F can be changed freely.

The helical winding device 40 winds the fiber bundles F in helical winding around the outer peripheral surface 1S of the liner 1. In the helical winding, the fiber bundle F is wound around the outer peripheral surface 1S of the liner 1 with the winding angle WA (refer to FIG. 2) of the fiber bundle F being a predetermined value (for example, 0 to 60 degrees). The helical winding device 40 mainly includes a base 41 and a helical winding support device 42. The actuation of the helical winding device 40 is controlled by the controller C.

On the base 41, the helical winding support device 42 is mounted. The helical winding support device 42 includes a first helical head 43 as a first guide unit and a second helical head 44 as a second guide unit. To the first helical head 43 and the second helical head 44, fiber bundles F are supplied from a plurality of bobbins (not-shown), and then the fiber bundles F are guided to the outer peripheral surface 1S of the liner 1 (refer to FIG. 2).

In the helical winding, the helical winding device 40 is fixed, and the liner 1 is conveyed in the direction of the central axis Ra while being rotated by the liner conveyance device 20. Thus, the helical winding is performed. It is to be noted that, by adjusting the Conveying speed and rotating speed of the liner 1, the winding form of the fiber bundles F can be changed freely.

Figure 2:
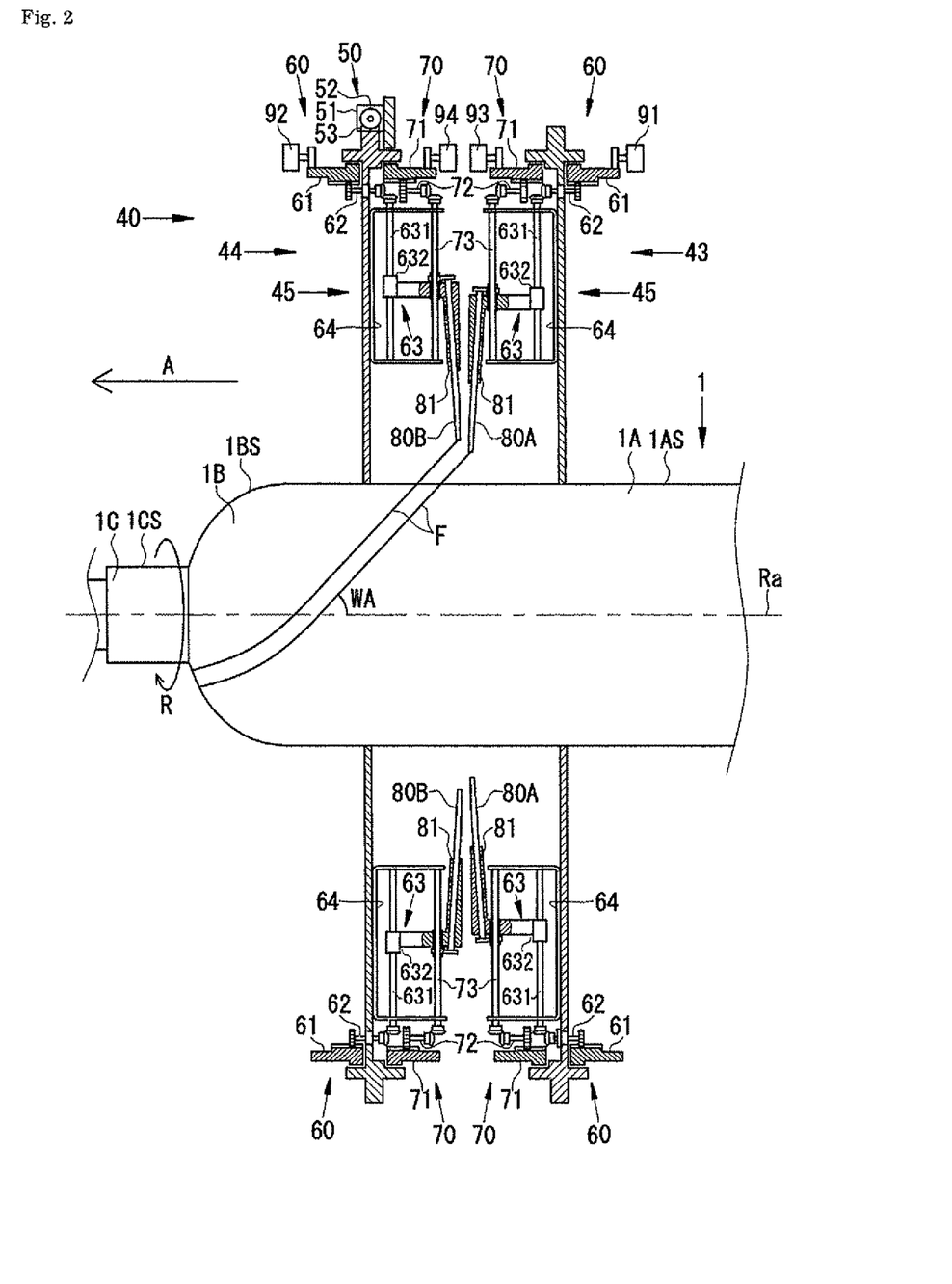
FIG. 2 is a schematic diagram illustrating a first helical head 43 and a second helical head 44 that construct a helical winding device 40.

Next, the first helical head 43 and the second helical head 44 that construct the helical winding device 40 are further described in detail. FIG. 2 is a side view showing the first helical head 43 and the second helical head 44. An arrow A shown in the drawing indicates the conveyance direction of the liner 1. Furthermore, an arrow R indicates the rotation direction of the liner 1.

As shown in FIG. 2, the first helical head 43 and the second helical head 44 are adjacently arranged in the conveyance direction of the liner 1. The first helical head 43 and the second helical head 44 include fiber supplying guides 80A and 80B configured to guide fiber bundles F to the outer peripheral surface 1S of the liner 1. The first helical head 43 includes a plurality of fiber supplying guides 80A that are arranged radially and are approximately perpendicular to the central axis Ra of the liner 1. The second helical head 44 includes a plurality of fiber supplying guides 80B that are arranged radially and are approximately perpendicular to the central axis Ra of the liner 1. Specifically, the fiber supplying guides 80A and 80B provided respectively to the first helical head 43 and the second helical head 44 are arranged in two rows in the conveyance direction of the liner 1.

The first helical head 43 and the second helical head 44 include a plurality of guide supporting devices 45. The guide supporting devices 45 support the fiber supplying guide 80A and the fiber supplying guide 80B. The guide supporting devices 45 support the fiber supplying guides 80A and 80B in such a manner that the fiber supplying guides 80A and 80B can extend and contract in a direction approximately perpendicular to the central axis Ra and that the fiber supplying guides 80A and 80B are rotatable around its axis. The first helical head 43 is configured in such a manner that the fiber supplying guides 80A can only be extended or contracted and rotated simultaneously by the same amount, and the second helical head 44 is also configured in such a manner that the fiber supplying guides 80B can only be extended or contracted and rotated simultaneously only by the same amount. Further, the fiber supplying guides 80A of the first helical head 43 and the fiber supplying guides 80B of the second helical head 44 can be adjusted to extend, contract, and rotate by different amounts.

Thus, the first helical head 43 and the second helical head 44 can guide a plurality of fiber bundles F simultaneously to the outer peripheral surface 1S of the liner 1. In this FW apparatus 100, the first helical head 43 includes 90 fiber supplying guides 80A, and the second helical head 44 includes 90 fiber supplying guides 80B. Therefore, it is possible to perform the helical winding with a total of 180 fiber bundles F being simultaneously guided to the outer peripheral surface 1S of the liner 1.

Moreover, this FW apparatus 100 includes a driving unit 50 that drives the second helical head 44 in the circumferential direction of the liner 1 around the central axis Ra of the liner 1. The drive unit 50 includes a worm gear 52 rotated by an electric motor 51 and a rack gear 53 secured to the second helical head 44. The driving unit 50 drives the second helical head 44 with the rotation power of the electric motor 51. With this configuration, the driving unit 50 can drive the second helical head 44 and adjust the phase difference between the first helical head 43 and the second helical head 44.

Figure 3:
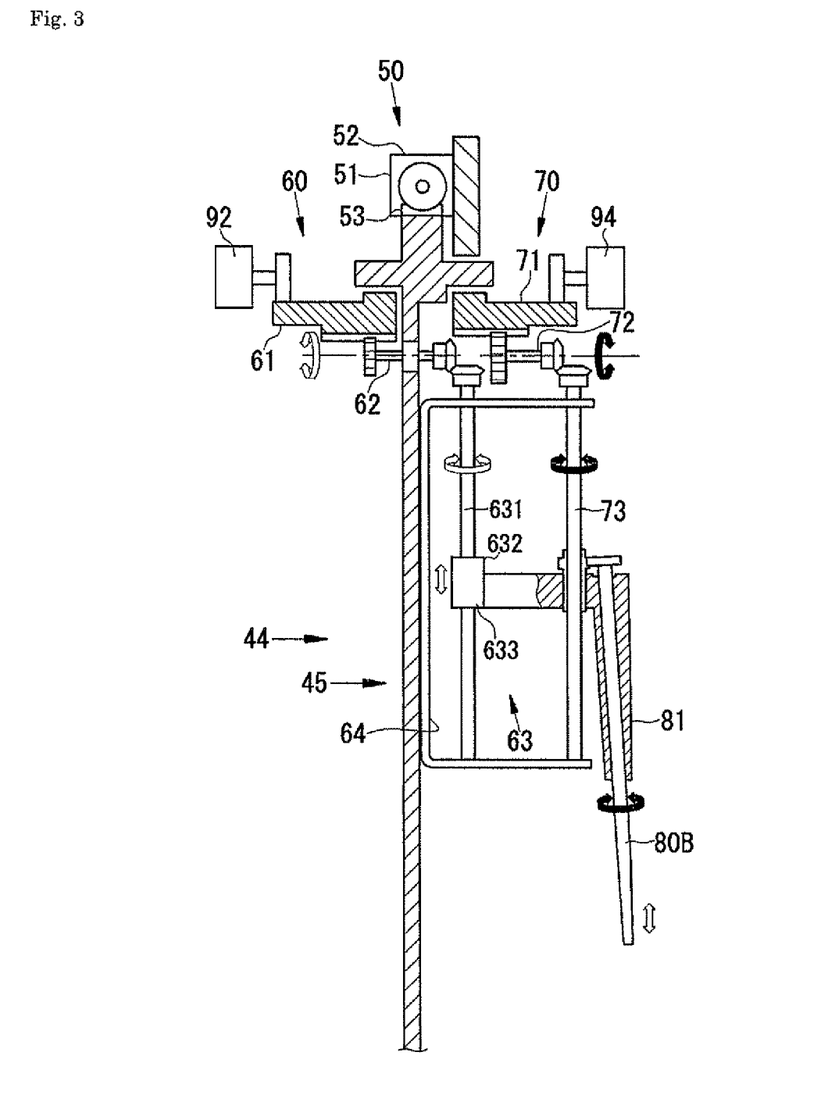
FIG. 3 is a schematic diagram illustrating a guide supporting device 45 that constructs the first helical head 43 and the second helical head 44.

Next, with reference to FIG. 2 and FIG. 3, the guide supporting devices 45 that support the fiber supplying guides 80A of the first helical head 43 and the fiber supplying guides 80B of the second helical head 44 are described further in detail.

FIG. 3 is a side view of the guide supporting device 45. The guide supporting devices 45 are arranged radially to the first helical head 43 and the second helical head 44 in the number corresponding to the number of each of the fiber supplying guides 80A and 80B, and each of the guide supporting devices 45 includes a movement mechanism 60 and a rotation mechanism 70. In the drawing, a white arrow indicates the operation direction of each member that constructs the movement mechanism 60. Further, a black arrow indicates the operation direction of each member that constructs the rotation mechanism 70.

The movement mechanism 60 changes an amount of extension or contraction of each of the fiber supplying guides 80A and 80B in the direction approximately perpendicular to the central axis Ra of the liner 1. The movement mechanism 60 mainly includes a rotation tube 61, an intermediate shaft 62, and a ball screw 63. The movement mechanism 60 of the first helical head 43 is driven by an electric motor 91 serving as a driving unit that changes an amount of extension or contraction of the fiber supplying guides 80A. The movement mechanism 60 of the second helical head 44 is driven by an electric motor 92 serving as a driving unit that changes an amount of extension or contraction of the fiber supplying guide 80B.

The rotation tube 61 is an annular member having an internal gear on its inner peripheral surface. The rotation tube 61 is coaxially arranged around the central axis Ra of the liner 1, and rotated by the electric motors 91 and 92.

The intermediate shaft 62 transmits the rotation of the rotation tube 61 to a spiral shaft 631 that constructs the ball screw 63. A pinion gear disposed on the one end of the intermediate shaft 62 is meshes with the internal gear of the rotation tube 61. Moreover, a bevel gear disposed on the other end of the intermediate shaft 62 meshes with the bevel gear of the spiral shaft 631.

The ball screw 63 is a mechanism that converts the rotating motion of the intermediate shaft 62 into the movement motion of the guide supporting member 81. The ball screw 63 mainly includes a spiral shaft 631 and a ball nut 632.

The spiral shaft 631 is rotated by the intermediate shaft 62. On the outer peripheral surface of the spiral shaft 631, a groove having a cross-sectional shape of an arc is formed to define a spiral form. The spiral shaft 631 is supported rotatably by an annular member 64 having a cross-sectional shape of a letter "C".

The ball nut 632 is a tubular member that is fit externally around the spiral shaft 631. On the inner peripheral surface of the ball nut 632, a groove having a cross-sectional shape of an arc is formed to define a spiral form. Further, the ball nut 632 is inserted and secured in a through-hole provided to the guide supporting member 81. The groove cut in the inner periphery surface of the ball nut 632 is arranged to face the groove cut in the outer periphery surface of the spiral shaft 631, thereby forming a spiral space having a circular cross-sectional view.

In the spiral space mentioned above, a steel ball is provided. The steel ball is held between the groove formed in the spiral shaft 631 and the groove formed in the ball nut 632. Since a plurality of steel balls are provided in the spiral space, the ball nut 632 does not become rickety.

With this configuration, the movement mechanism 60 transmits the driving power of one of the electric motors 91 and 92 to the spiral shaft 631 via the rotation tube 61 and the intermediate shaft 62, and converts the rotating motion of the spiral shaft 631 into the shifting motion of the guide supporting member 81. Accordingly, the plurality of the fiber supplying guides 80A and 80B supported by the guide supporting member 81 can be extended and contracted in the direction approximately perpendicular to the central axis Ra of the liner 1.

Further, the fiber supplying guides 80A of the first helical head 43 and the fiber supplying guides 80B of the second helical head 44 can be extended and contracted with amount and timing of extension and contraction being different therebetween. The amount and timing of extension or contraction of the fiber supplying guides 80A of the first helical head 43 is controlled by the controller C controlling the rotation direction, the amount of rotation, and the rotation timing of the electric motor 91. The amount and the timing of extension and contraction of the fiber supplying guides 80B of the second helical head 44 is controlled by the controller C controlling the rotation direction, amount of rotation, and the rotation timing of the electric motor 92.

The rotation mechanism 70 makes the fiber supplying guides 80A and 80B rotate around the respective axes of the fiber supplying guides 80A and 80B. The rotation mechanism 70 mainly includes a rotation tube 71, an intermediate shaft 72, and a driving shaft 73. The rotation mechanism 70 of the first helical head 43 is driven by an electric motor 93 serving as a driving unit that changes an amount of rotation of the fiber supplying guides 80A. The rotation mechanism 70 of the second helical head 44 is driven by an electric motor 94 serving as a driving unit that changes an amount of rotation of the fiber supplying guides 80B.

The rotation tube 71 is an annular member having an internal gear formed on an inner peripheral surface. The rotation tube 71 is coaxially arranged around the central axis Ra of the liner 1, and rotated by the electric motors 93 and 94.

The intermediate shaft 72 is a member that transmits the rotation of the rotation tube 71 to the driving shaft 73. A pinion gear disposed on the one end of the intermediate shaft 72 meshes with the internal gear of the rotation tube 71. Moreover, a bevel gear disposed on the other end of the intermediate shaft 72 meshes with the bevel gear of the driving shaft 73.

The driving shaft 73 transmits the rotation of the intermediate shaft 72 to the fiber supplying guide 80A, 80B. As mentioned above, the bevel gear disposed on the one end of the driving shaft 73 meshes with the bevel gear of the intermediate shaft 72. Further, a driving gear that is fit externally around the driving shaft 73 meshes with the driven gear of the fiber supplying guide 80A, 80B. The driving shaft 73 is supported rotatably by the annular member 64 having a cross-sectional shape of a letter "C".

With this configuration, the rotation mechanism 70 transmits the driving power of one of the electric motors 93 and 94 to the driving shaft 73 via the rotation tube 71 and the intermediate shaft 72, and the fiber supplying guides 80A and 80B can rotate about the respective axes of the fiber supplying guides 80A and 80B via the respective driven gears of the fiber supplying guides 80A and 80B.

Further, the fiber supplying guides 80A of the first helical head 43 and the fiber supplying guides 80B of the second helical head 44 can be rotated with the direction, amount, and timing of rotation being different therebetween. The direction, the amount, and the timing of rotation of the fiber supplying guides 80A of the first helical head 43 is controlled by the controller C controlling the direction, the amount, and the timing of rotation of the electric motor 93. The direction, the amount, and the timing of rotation of the fiber supplying guides 80B of the second helical head 44 is controlled by the controller C controlling the direction, the amount, and the timing of rotation of the electric motor 94.

Figure 4:
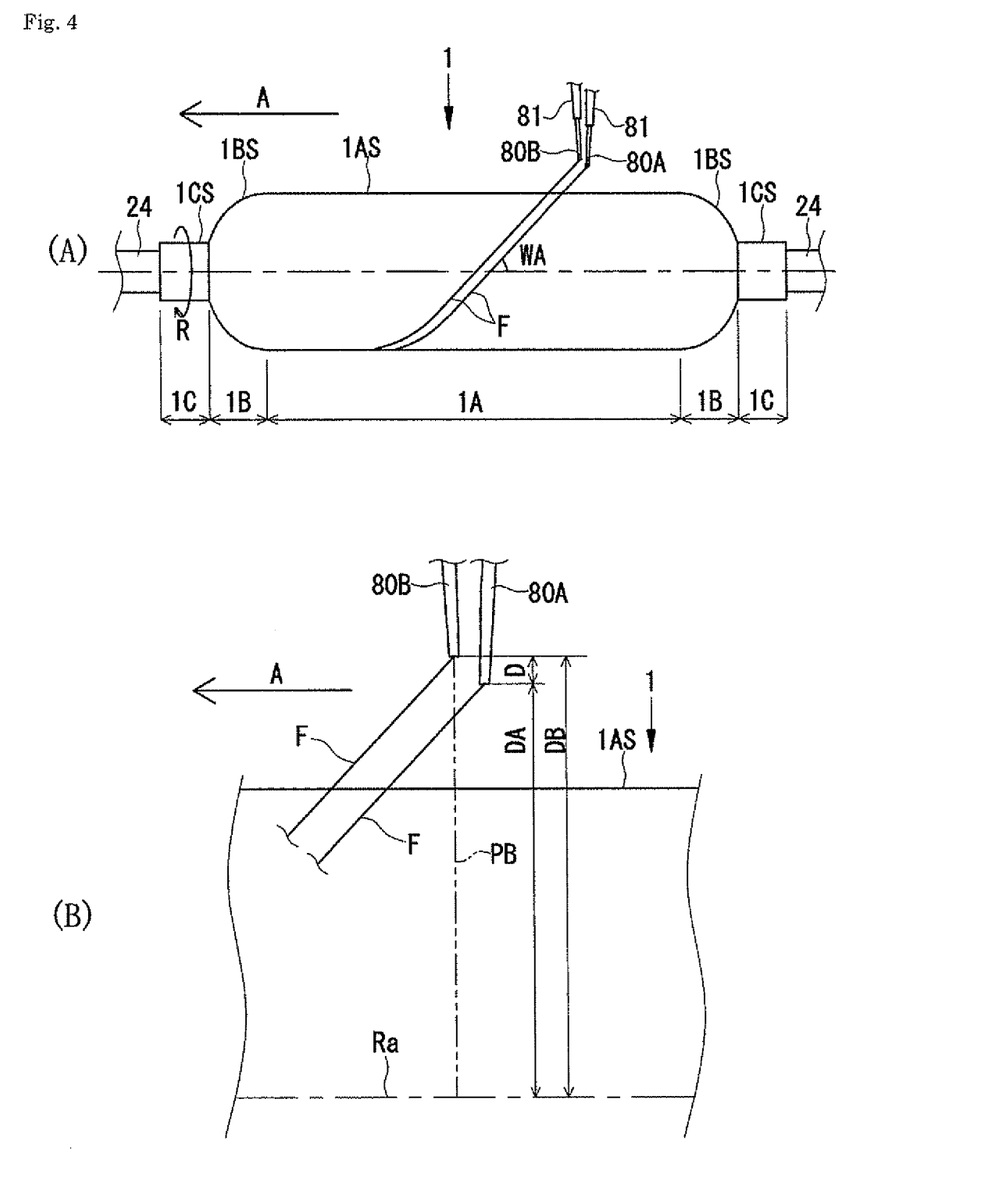
FIGS. 4A and 5A are side views showing the state where fiber bundles F are wound in helical winding around an outer peripheral surface 1AS of a first tubular portion 1A.
FIGS. 4B and 5B are enlarged views of an area around the fiber supplying guide 80A in FIGS. 4A and 5A.

Next, operations of the fiber supplying guides 80A and 80B in the helical winding of the FW apparatus 100 with the above configuration will be described. It is assumed that the liner 1 used in the present embodiment includes a first tubular portion 1A having a constant radius, dome portions 1B respectively disposed on both ends of the tubular portion 1A, and second tubular portions 1C respectively disposed on ends of the dome portions 1B (refer to FIG. 4). Further, it is assumed that the liner 1 is mounted on the liner conveyance device 20, and that winding conditions, such as the conveyance speed and rotation speed of the liner 1, the number of times to convey the liner 1 in a reciprocated manner, a conveyance distance, and the like are inputted to the controller C beforehand by an operator. The controller C is configured to control the actuation of the electric motors 91 and 92 based on the inputted winding conditions, and to control the fiber supplying guides 80A and 80B in the following way. In the below description, the operations of the fiber supplying guides 80A and 80B at the right end part of the liner 1 shown in the drawings is described. The controller C is configured to also control the fiber supplying guides 80A and 80B at the left end part of the liner 1 shown in the drawings similarly.

Figure 5:
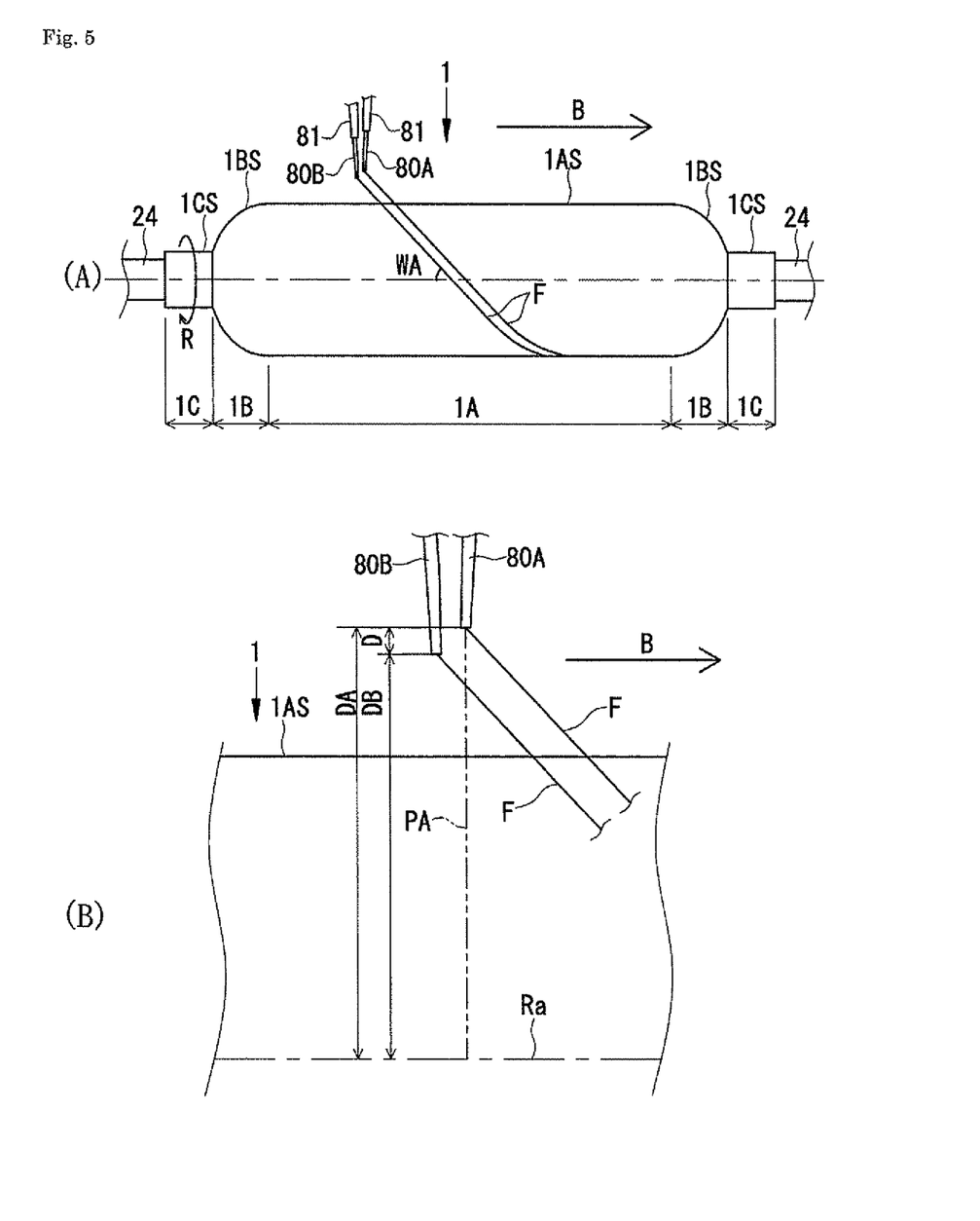

FIG. 4A and FIG. 5A are side views showing the state where the fiber bundles F are wound in the helical winding around the outer peripheral surface 1AS of the first tubular portion 1A. FIG. 4B and FIG. 5B are enlarged views of an area around the fiber supplying guide 80A in FIG. 4A and FIG. 5A, respectively. An arrow A shown in FIG. 4 indicates the conveyance direction of the liner 1, and an arrow B shown in FIG. 5 indicates that the liner 1 is conveyed in the direction opposite to the conveyance direction in FIG. 4. An arrow R in FIG. 4A and FIG. 5A shows the rotation direction of the liner 1. In the helical winding, the fiber bundles F are wound while the liner 1 is conveyed. Accordingly, the winding direction of the fiber bundle F (hereafter, merely referred to as "winding direction") relative to a direction of the central axis of the liner 1 is opposite to the conveyance direction of the liner 1. Therefore, in FIG. 4, the winding direction of the fiber bundle F is the rightward direction in the drawing, opposite to the direction indicated by the arrow A, and in FIG. 5, the winding direction of the fiber bundle F is the leftward direction in the drawing, opposite to the direction indicated by the arrow B.

In the case of the winding direction shown in FIG. 4, a fiber bundle F supplied from the fiber supplying guide 80A of the first helical head 43 crosses between the fiber supplying guide 80B of the second helical head 44 and the liner 1. Here, "the state where the fiber bundle F supplied from the fiber supplying guide 80A crosses between the fiber supplying guide 80B and the liner 1" is described. As shown in FIG. 4B, an imaginary plane PB that passes through the distal end of the fiber supplying guide 80B of the second helical head 44 and is perpendicular to the central axis Ra of the liner 1 is considered. A fiber bundle F supplied from the fiber supplying guide 80A is drawn out obliquely toward the fiber supplying guide 80B side, and thus the fiber bundle F supplied from the fiber supplying guide 80A passes through the imaginary plane PB. This resulting state is defined as "the state where the fiber bundle F supplied from the fiber supplying guide 80A crosses between the fiber supplying guide 80B and the liner 1". The meaning of "the state where the fiber bundle F supplied from the fiber supplying guide 80A crosses between the fiber supplying guide 80B and the liner 1" is assumed to be the same in the following description.

In the case of the winding direction shown in FIG. 4, the controller C controls an amount of extension or contraction of each of the fiber supplying guides 80A and 80B by controlling the actuation of each of the electric motors 91 and 92, in such a way that, as shown in FIG. 4B, the distance DB from the distal end of the fiber supplying guide 80B to the central axis Ra of the liner 1 is made larger than the distance DA from the distal end of the fiber supplying guide 80A to the central axis Ra of the liner 1 (by a difference D in distance).

Specifically, the distance DB from the fiber supplying guide 80B of the second helical head 44, which is a rear side guide unit in the winding direction (the direction opposite to that indicated by the arrow A), to the liner 1 is made larger by the difference D in distance than the distance DA from the fiber supplying guide 80A of the first helical head 43, which is a front side guide unit in the winding direction, to the liner 1.

In the case of the winding direction shown in FIG. 5, a fiber bundle F supplied from the fiber supplying guide 80B of the second helical head 44 crosses between the fiber supplying guide 80A of the first helical head 43 and the liner 1. Here, "the state where the fiber bundle F supplied from the fiber supplying guide 80B crosses between the fiber supplying guide 80A and the liner 1" is described. As shown in FIG. 5B, an imaginary plane PA that passes through the distal end of the fiber supplying guide 80A of the first helical head 43 and is perpendicular to the central axis Ra of the liner 1 is considered. A fiber bundle F supplied from the fiber supplying guide 80B is drawn out obliquely toward the fiber supplying guide 80A side, and thus the fiber bundle F supplied from the fiber supplying guide 80B passes through the imaginary plane PA. This resulting state is defined as "the state where the fiber bundle F supplied from the fiber supplying guide 80B crosses between the fiber supplying guide 80A and the liner 1". The meaning of "the state where the fiber bundle F supplied from the fiber supplying guide 80B crosses between the fiber supplying guide 80A and the liner 1" is assumed to be the same in the following description.

In the case of the winding direction shown in FIG. 5, the controller C controls an amount of extension or contraction of each of the fiber supplying guides 80A and 80B by controlling the actuation of each of the electric motors 91 and 92, in such a way that, as shown in FIG. 5B, the distance DA from the distal end of the fiber supplying guide 80A to the central axis Ra of the liner 1 becomes larger than the distance DB from the distal end of the fiber supplying guide 80B to the central axis Ra of the liner 1 (by a difference D in distance).

Specifically, the distance DA from the fiber supplying guide 80A of the first helical head 43, which is a rear side guide unit in the winding direction (the direction opposite to the arrow B), to the liner 1 is made larger than the distance DB from the fiber supplying guide 80B of the second helical head 44, which is a front side guide unit in the winding direction, to the liner 1.

It is assumed that, in FIG. 4, the distance DB from the fiber supplying guide 80B to the liner 1 is equal to the distance DA from the fiber supplying guide 80A to the liner 1. In this case, a fiber bundle F supplied from the fiber supplying guide 80A might interfere with the fiber supplying guide 80B or a fiber bundle F supplied from the fiber supplying guide 80B. Thus, a damaged portion, such as fiber breakage, might be formed on the fiber bundles F, and thus the strength of a reinforcement layer formed on the periphery of the liner 1 might be degraded. As shown in FIG. 4 and FIG. 5, the distance DB (DA) from the fiber supplying guide 80B (80A) at the rear side in the winding direction of the fiber bundle F (the front side in the conveyance direction of the liner 1) to the liner 1 is made larger than the distance DA (DB) from the fiber supplying guide 80A (80B) at the front side in the winding direction of the fiber bundle F (the rear side in the conveyance direction of the liner 1) to the liner 1, whereby, a fiber bundle F can be prevented from interfering with other fiber bundles F and the fiber supplying guide when the fiber bundles F is supplied to the liner 1.

Figure 6:
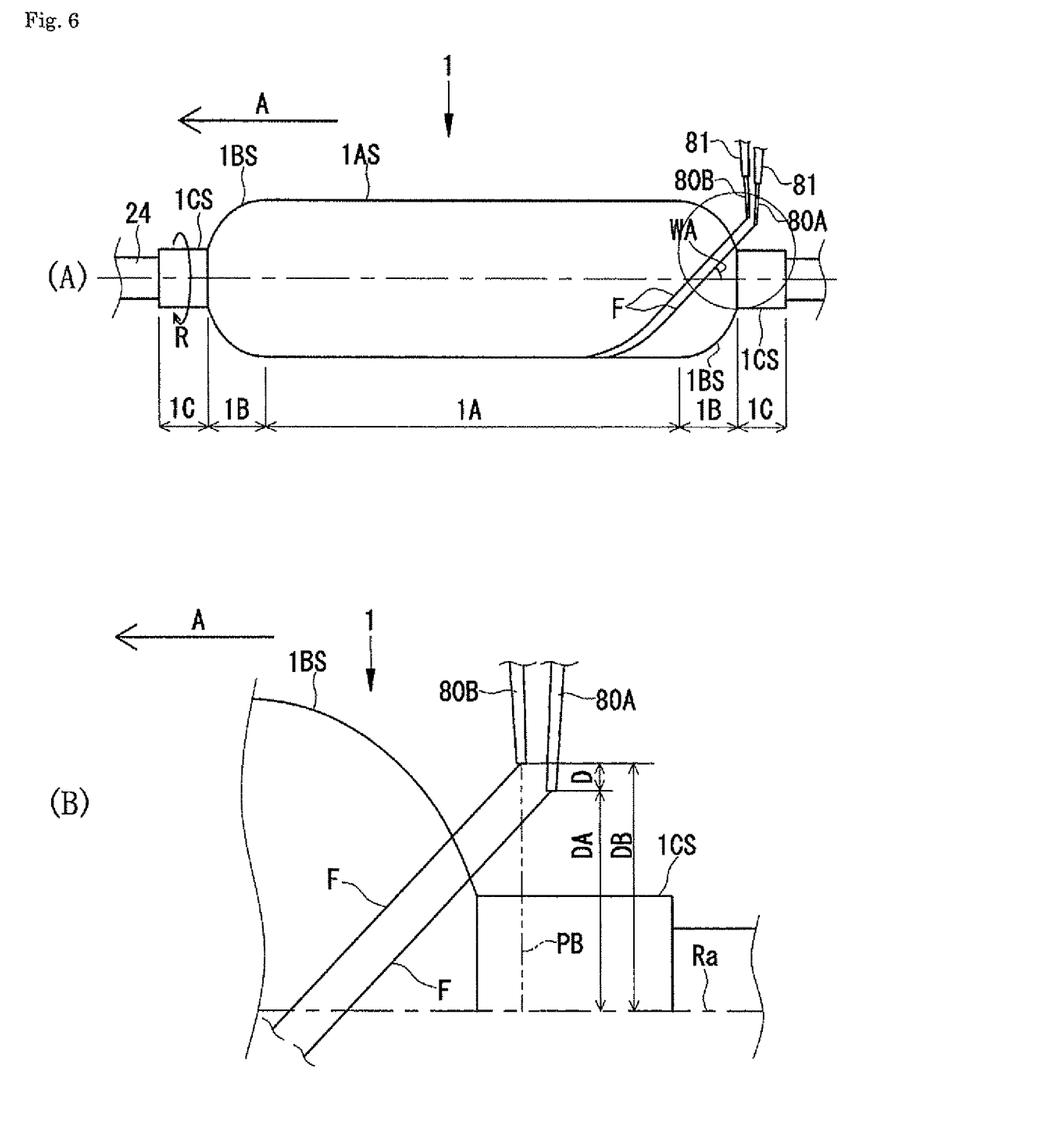
FIG. 6A is a side view showing the state where the fiber bundles F are wound in helical winding around an outer peripheral surface 1BS of a dome portion 1B.
FIG. 6B is an enlarged view of an area around the fiber supplying guides 80A and 80B in FIG. 6A.

FIG. 6A is a side view showing the state where the fiber bundle F is wound in the helical winding around the outer peripheral surface 1BS of the dome portion 1B. FIG. 6B is an enlarged view of an area around the fiber supplying guides 80A and 80B in FIG. 6A. An arrow A shown in FIG. 6 indicates the conveyance direction of the liner 1, and an arrow R indicates the rotation direction of the liner 1. As shown in FIG. 6A, as the outer peripheral surface 113S of the dome portion 1B becomes nearer to the end portion, the radius becomes smaller. Accordingly, for example, an amount of expansion and contraction of each of the fiber supplying guides 80A and 80B is adjusted in such a manner that each of the fiber supplying guides 80A and 80B moves along the outer peripheral surface 113S of the dome portion 1B. In this case, the controller C controls an amount of expansion and contraction of each of the fiber supplying guides 80A and 80B by controlling the actuation of each of the electric motors 91 and 92, thereby adjusting the distances DA and DB from the respective fiber supplying guides 80A and 80B to the central axis Ra of the liner 1 such that each of the fiber supplying guides 80A and 80B moves along the shape of the outer peripheral surface 1BS of the dome portion 1B.

Further, at this time, the controller C maintains the difference D between the distance DA from the fiber supplying guide 80A to the central axis Ra of the liner 1 and the distance DB from the fiber supplying guide 80B to the central axis Ra of the liner 1. Thus, when the fiber bundles F are wound in the helical winding around the outer peripheral surface 1BS of the dome portion 1B, the fiber bundles F can be uniformly wound around the entire body of the liner 1, while preventing the interference of the fiber bundles F.

Figure 7:
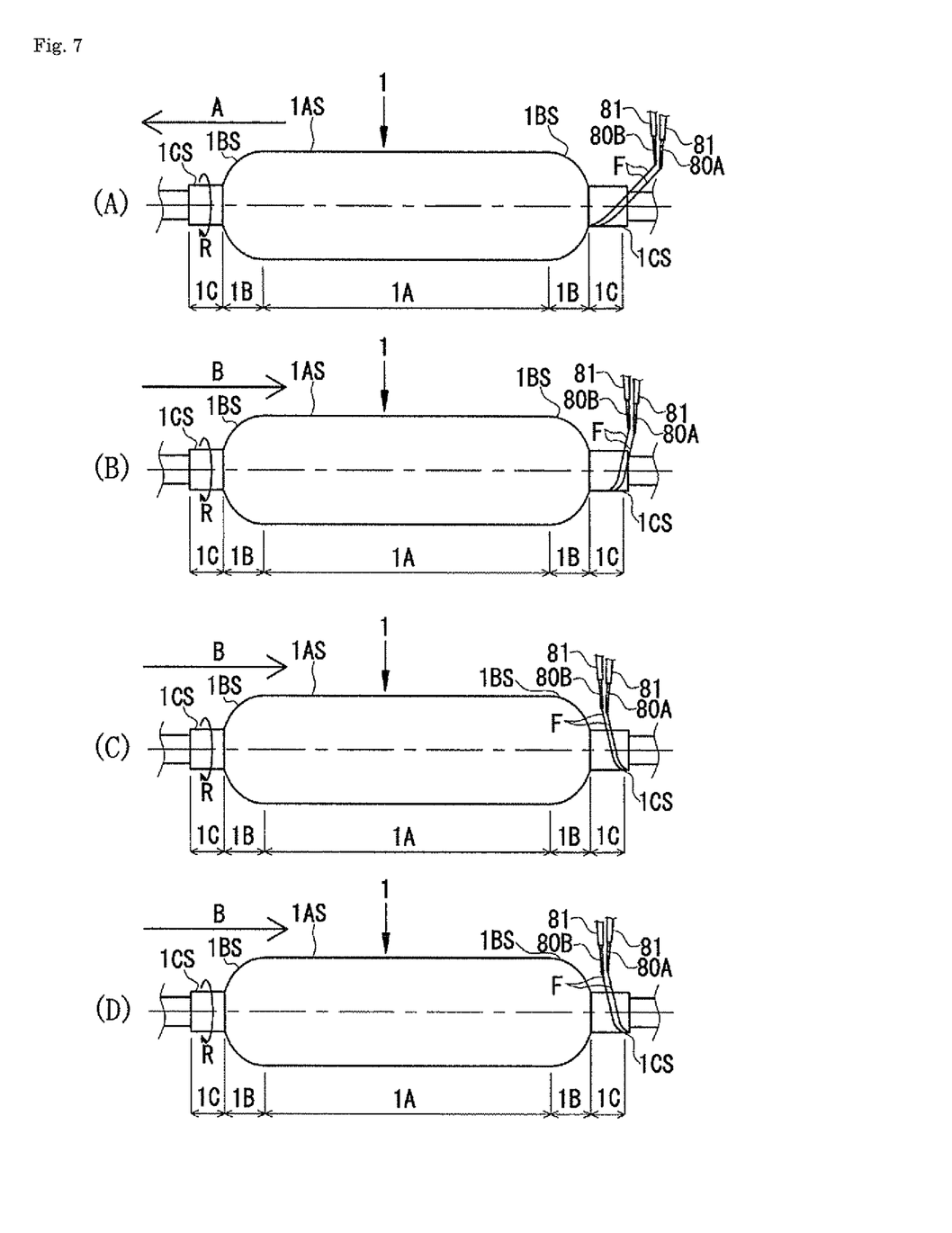
FIGS. 7A-7D are side views showing the state where the winding direction of fiber bundles F is switched while the fiber bundles F are wound in helical winding around an outer peripheral surface 1CS of a second tubular portion 1C.

Next, FIG. 7 is a side view showing the state of switching the winding direction of the fiber bundle F while winding the fiber bundle F in the helical winding around the outer peripheral surface 1CS of the second tubular portion 1C. In FIG. 7A, the conveyance direction of the liner 1 is the direction indicated by the arrow A, and the winding direction of the fiber bundle F is the rightward direction, in the drawing, opposite to the direction indicated by the arrow A. In this state, a fiber bundle F supplied from the fiber supplying guide 80A of the first helical head 43 crosses between the fiber supplying guide 808 of the second helical head 44 and the liner 1. The controller C controls an amount of expansion and contraction of each of the fiber supplying guides 80A and 80B by controlling the actuation of each of the electric motors 91 and 92, in such a way that the distance from the fiber supplying guide 80B to the central axis Ra of the liner 1 is made larger than the distance from the fiber supplying guide 80A to the central axis Ra of the liner 1.

Specifically, in the state of FIG. 7A, the distance from the fiber supplying guide 80B of the second helical head 44 being a rear side guide unit in the winding direction (the direction opposite to the arrow A) to the liner 1 is made larger than the distance from the fiber supplying guide 80A of the first helical head 43 being a front side guide unit in the winding direction to the liner 1.

In FIG. 7B, the conveyance direction of the liner 1 has been switched from the direction in FIG. 7A to the direction indicated by the arrow B, and the winding direction of the fiber bundle F has been switched to the leftward direction, in the drawing, opposite to the arrow B. After switching the winding direction of the fiber bundle F, the controller C performs a switching operation to switch the large-small relationship between the distance from the fiber supplying guide 80A of the first helical head 43 to the liner 1 and the distance from the fiber supplying guide 80B of the second helical head 44 to the liner 1 (refer to FIG. 7D). However, in the state shown in FIG. 7B, the switching operation has not been performed yet.

This is because of the following reason. The state shown in FIG. 7B represents the state immediately after the winding direction of the fiber bundle F has been switched. Accordingly, the winding position of the fiber bundles F being wound around the liner 1 is more on the front side than the position of each of the fiber supplying guide 80A of the first helical head 43 and the fiber supplying guide 80B of the second helical head 44 in the winding direction of the fiber bundle F (the direction opposite to the direction indicated by the arrow B). That is, a fiber bundle F supplied from the fiber supplying guide 80A of the first helical head 43 is crossing between the fiber supplying guide 80B of the second helical head 44 and the liner 1 as in the state in FIG. 7A.

If the switching operation is performed in the state of FIG. 7B, the fiber bundle F supplied from the fiber supplying guide 80A might interfere with the fiber supplying guide 80B and the fiber bundle F supplied from the fiber supplying guide 80B. For this reason, in the state of FIG. 7B immediately after the winding direction of the fiber bundle F has been switched, the switching operation has not been performed yet. Thus, in the state immediately after the winding direction of the fiber bundle F has been switched, the fiber bundle F supplied from the fiber supplying guide 80A can be prevented from interfering with other fiber bundles F and the fiber supplying guide 80B.

In FIG. 7C, as compared with FIG. 7B, the winding of the fiber bundles F is more advanced. The winding position of the fiber bundles F being wound around the liner 1 is changed to be more on the rear side than the position of each of the fiber supplying guide 80A of the first helical head 43 and the fiber supplying guide 80B of the second helical head 44 in the winding direction of the fiber bundle F (the direction opposite to the indication indicated by the arrow B).

When the state of FIG. 7C is achieved, as shown in FIG. 7D, the controller C performs the switching operation to switch the large-small relationship between the distance from the fiber supplying guide 80A of the first helical head 43 to the liner 1 and the distance from the fiber supplying guide 80B of the second helical head 44 to the liner 1, in such a manner that the distance from the fiber supplying guide 80A of the first helical head 43, of the first helical head 43 and the second helical head 44, being a guide unit located more on the rear side in the winding direction to the liner 1 becomes larger than the distance from the fiber supplying guide 80B of the second helical head 44 being a side guide unit located more on the front side in the winding direction to the liner 1.

Thus, by performing the switching operation at a proper timing, in the state immediately after the winding direction of the fiber bundles F has been switched, the fiber bundle F supplied from the fiber supplying guide 80A can be prevented from interfering with the other fiber bundles F and the fiber supplying guide 80B. Further, in the state where the winding of the fiber bundles F is more advanced after the winding direction of the fiber bundle F has been switched, the fiber bundle F supplied from the fiber supplying guide 80A can be prevented from interfering with other fiber bundles F and the fiber supplying guide 80B.

As shown from FIG. 4 to FIG. 7, the liner 1 used in the present embodiment includes the first tubular portion 1A with a constant radius, the dome portions 1B respectively disposed on both ends of the first tubular portion 1A, and the second tubular portions 1C respectively disposed on the ends of the dome portions 113. The control to wind the fiber bundle F around the outer peripheral surface of the liner 1 at an equal pitch on the first tubular portion 1A and the second tubular portions 1C with uniform radii is easier than the control on the dome portions 1B in which the radius varies. In particular, the control to wind the fiber bundle F around the outer peripheral surface of the liner 1 at an equal pitch while performing the switching operation on the first tubular portion 1A and the second tubular portions 1C with constant radii is easier than the control on the dome portions 1B in which the radius varies.

As shown in FIG. 7, by performing the switching operation at the time of winding on the second tubular portion 1C, the control to wind the fiber bundle F around the outer peripheral surface of the liner 1 at an equal pitch can be easily performed while performing the switching operation. Further, since the switch operation is performed before winding the fiber bundle F on the first tubular portion 1A and the dome portion 1B is started, the control to wind the fiber bundles F at an equal pitch on the first tubular portion 1A and the dome portion 1B can be performed easily.

Figure 8:
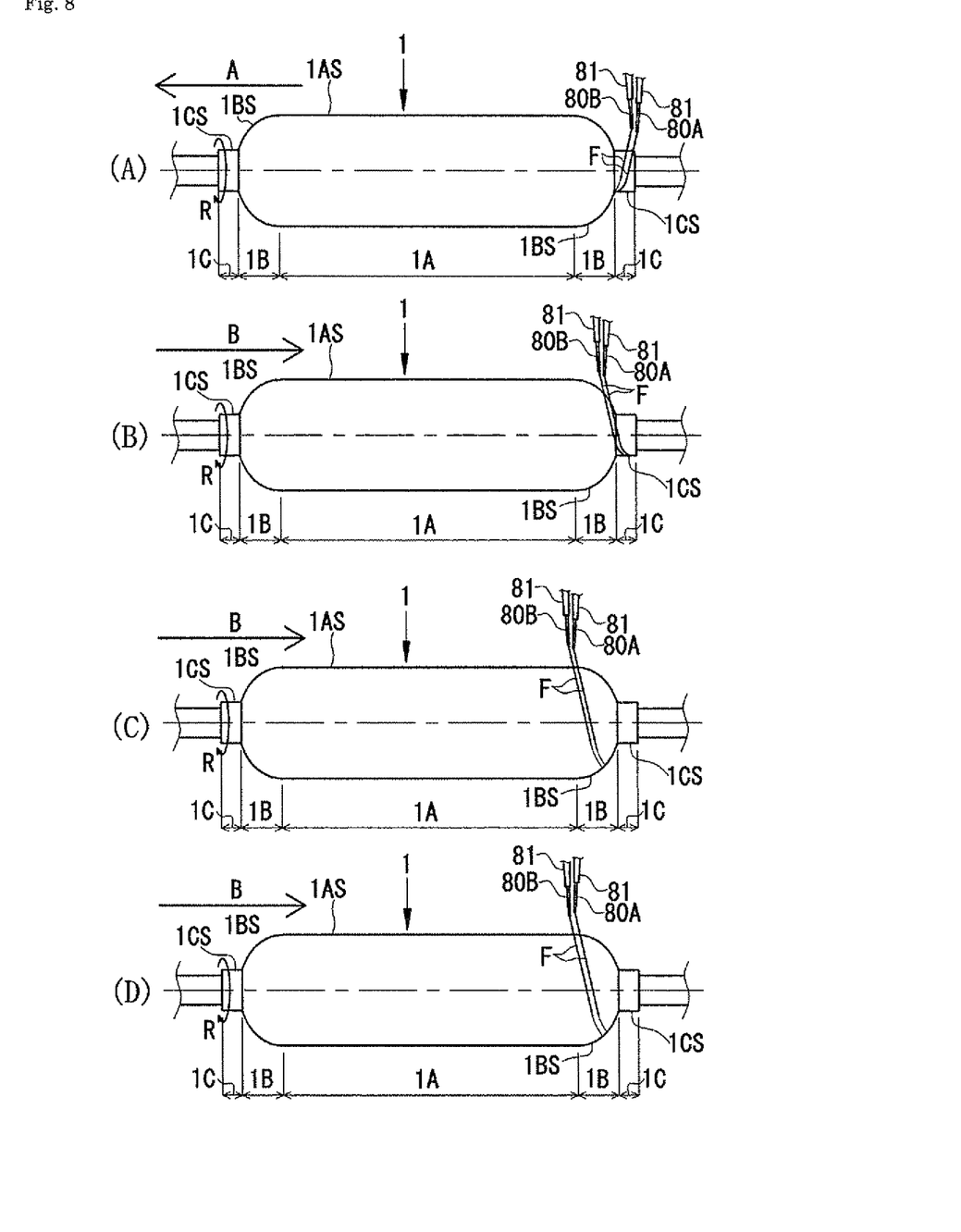
FIGS. 8A-8D are side views showing the state where an operation to switch the large-small relationship between distances from fiber supplying guides 80A and 80B to the central axis of the liner 1 is performed when winding is performed on the dome portion 1B.

Next, FIG. 8 is a side view showing the state where the switching operation to switch the large-small relationship between the distance from the fiber supplying guide 80A to the central axis Ra of the liner 1 and the distance from the fiber supplying guide 80B to the central axis Ra of the liner 1 is performed when the winding is performed on the dome portion 1B. The switching operation may be performed when the winding is performed on the dome portion 1B in the following case. For example, it is performed when, the winding direction of the fiber bundle F is switched when the winding is performed on the second tubular portion 1C but, since the length of the second tubular portion C is short, the winding on the second tubular portion 1C is completed before performing the switching operation, and thus the winding on the dome portion 1b is started.

In FIG. 8A, the conveyance direction of the liner 1 is the direction indicated by the arrow A, and the winding direction of the fiber bundle F is the rightward direction, in the drawing, opposite to the direction indicated by the arrow A. In this condition, the fiber bundle F is wound around the second tubular portion 1C, and a fiber bundle F supplied from the fiber supplying guide 80A of the first helical head 43 crosses between the fiber supplying guide 80B of the second helical head 44 and liner 1. The controller C controls an amount of expansion and contraction of each of the fiber supplying guides 80A and 80B by controlling the actuation of each of the electric motors 91 and 92, in such a way that the distance from the fiber supplying guide 80B to the liner 1 is made larger than the distance from the fiber supplying guide 80A to the liner 1.

In FIG. 8B, the conveyance direction of the liner 1 has been switched from the direction in FIG. 8A to the direction indicated by the arrow B, and the winding direction of the fiber bundle F has been switched to the leftward direction, in the drawing, opposite to the direction indicated by the arrow B. In FIG. 7, after the winding direction of the fiber bundle F has been switched, when the winding is performed on the second tubular portion 1C, the controller C performs the switching operation to switch the large-small relationship between the distance from the fiber supplying guide 80A to the liner 1 and the distance from the fiber supplying guide 80B to the liner 1 (refer to FIG. 7D). However, in FIG. 8B, although the winding on the second tubular portion 1C is completed and the winding of the dome portion 1B is about to start, the switching operation has not been performed yet.

This is because, since the length of the second tubular portion 1C is short, the winding on the second tubular portion 1C is completed before performing the switching operation, and thus the winding on the dome portion 1b is started.

Further, if the switching operation is performed in the state of FIG. 8B, the control to wind the fiber bundle F at an equal pitch around the outer peripheral surface needs to be performed while the switching operation on the dome portion 1B is performed. In the control to wind the fiber bundle F at an equal pitch around the dome portion 113, it is very important to control the distance between the outer peripheral surface 1BS of the dome portion 1B and each of the fiber supplying guides 80A and 80B. In particular, a region in which the radius changes sharply, i.e. a region of the dome portion 1B near the second tubular portion 1C is a region where the distance of each of the fiber supplying guides 80A and 80B is very difficult to control. For this reason, in FIG. 8B, although the winding on the dome portion 1B is about to start, the switching operation has not been performed yet.

In FIG. 8C, as compared with FIG. 8B, the winding of the fiber bundles F is more advanced, and the winding of the fiber bundles F around the dome portion 1B has been half way completed or more as viewed from the second tubular portion 1C side. In this region, the radius changes less as compared with the region near the second tubular portion 1C. Accordingly, in this region, it is relatively easy to control the switching operation to switch the large-small relationship between the distance from the fiber supplying guide 80A to the dome portion 1B and the distance from the fiber supplying guide 80B to the dome portion 1B while winding the fiber bundle F at an equal pitch.

Consequently, when the state of FIG. 8C is achieved, the controller C performs the switching operation to switch the large-small relationship between the distance from the fiber supplying guide 80A to the liner 1 and the distance from the fiber supplying guide 80B to the liner 1 as shown in FIG. 8D, whereby the distance from the fiber supplying guide 80A of the first helical head 43, of the first helical head 43 and the second helical head 44, being a guide unit located more on the rear side in the winding direction to the liner 1 becomes larger than the distance from the fiber supplying guide 80B of the second helical head 44 being a side guide unit located more on the front side in the winding direction to the liner 1.

Thus, when the switch operation is performed while the fiber bundle F is wound around the dome portion 1B, the controller C performs the switch operation after the winding of the fiber bundles F around the dome portion 1B has been half way completed or more. Accordingly, it is relatively easy to control the switching operation to switch the large-small relationship between the distance from the fiber supplying guide 80A to the dome portion 1B and the distance from the fiber supplying guide 80B to the dome portion 1B while the fiber bundles F are wound at an equal pitch. Therefore, it becomes easy to control the winding position of the fiber bundles F wound around the dome portion 1B by an amount of extension or contraction of each of the fiber supplying guides 80A and 80B.

Figure 9:
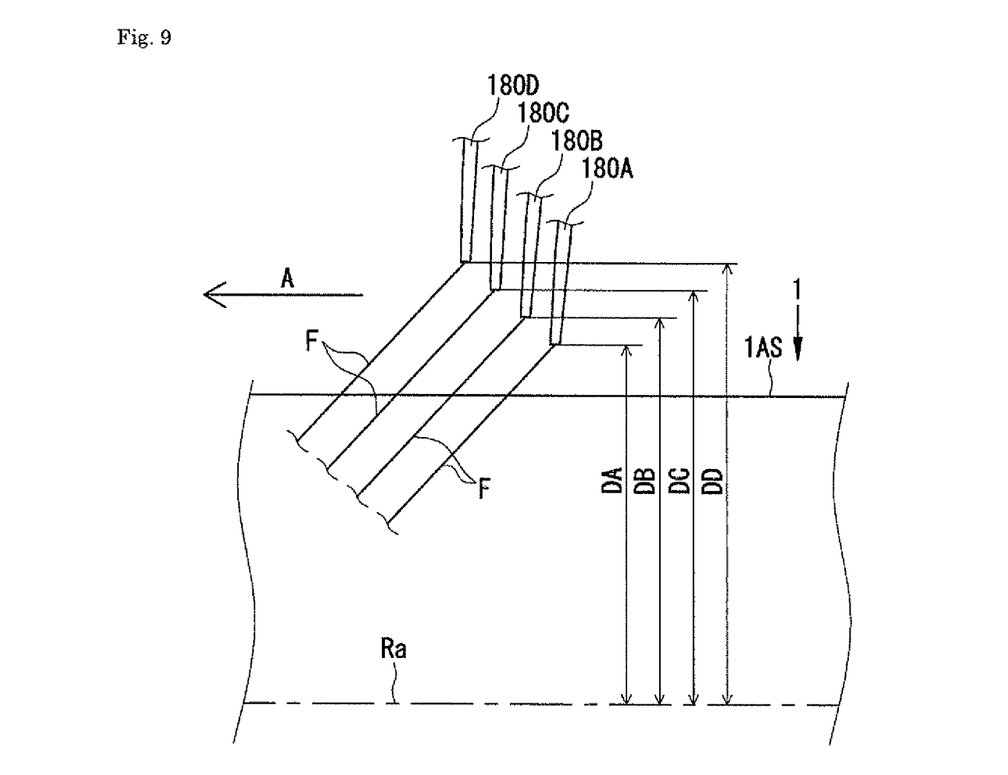
FIG. 9 is an enlarged view showing an area around fiber supplying guides 180A, 180B, 180C, and 180D according to another embodiment of the present invention.

The embodiments of the present invention have been described in the above. The present invention is not limited to the above embodiments, and may be modified in various ways. For example, the helical winding support device 42 includes two helical heads of the first helical head 43 and the second helical head 44, but the present invention is not limited to this configuration. If a number of fiber bundles F are provided, fiber supplying guides needs to be dispersed along the direction of the central axis Ra of the liner 1 by providing three or more helical heads to the helical winding support device 42. The present invention can be applied also to such a FW device equipped with three or more helical heads. FIG. 9 shows the case where four helical heads are provided and fiber supplying guides 180A, 180B, 180C, and 180D are provided. As shown in FIG. 9, with a distance (for example, DD) from a fiber supplying guide (for example, a helical head 180D) located at a rear side in the winding direction of a fiber bundle F (a front side in terms of the conveyance direction A of a liner 1) to the central axis Ra of the liner 1 being larger than a distance (for example, DC) from a fiber supplying guide (for example, a helical head 180C) located at a front side in the winding direction of the fiber bundles F (a rear side in terms of the conveyance direction A of the liner 1) to the central axis Ra of the liner 1, the fiber bundle F can be prevented from interfering with the other fiber bundles F and the fiber supplying guides when the fiber bundles F are supplied to the liner 1.

INDUSTRIAL APPLICABILITY

A filament winding apparatus of the present invention can prevent a fiber bundle from interfering with other fiber bundles and fiber supplying guides when the fiber bundles are supplied to a liner, and thus is industrially useful.

DESCRIPTION OF THE REFERENCE NUMERAL

1 Liner
1S Outer peripheral surface
10 Main base
20 Liner conveyance device
30 Hoop winding device
40 Helical winding device
42 Helical winding support device
43 First helical head
44 Second Helical head
45 Guide supporting device
50 Driving unit
51 Electric motor
52 Worm gear 53 Rack gear
60 Moving mechanism
61 Rotation tube
62 Intermediate shaft
63 Ball screw
70 Rotation mechanism
71 Rotation tube
72 Intermediate shaft
73 Driving shaft
80A, 80B Fiber supplying guide
81 Guide supporting member
100 Filament winding apparatus
F Fiber bundle
WA Winding angle

The invention claimed is:

1. A filament winding apparatus configured to wind a fiber bundle around a liner, comprising:
   a first guide unit and a second guide unit each comprising a plurality of fiber supplying guides arranged radially and extending and contracting in a direction approximately perpendicular to a central axis of the liner;
   a driving unit configured to change an amount of extension or contraction of the fiber supplying guides; and
   a controller configured to adjust a distance between the fiber supplying guides and the central axis of the liner by controlling the driving unit, wherein
   when a fiber bundle supplied from a fiber supplying guide of the first guide unit crosses between a fiber supplying guide of the second guide unit and the liner, the controller makes the distance from the fiber supplying guide of the second guide unit to the central axis of the liner larger than the distance from the fiber supplying guide of the first guide unit to the central axis of the liner, and
   when a fiber bundle supplied from the fiber supplying guide of the second guide unit crosses between the fiber supplying guide of the first guide unit and the liner, the controller makes the distance from the fiber supplying guide of the first guide unit to the central axis of the liner larger than the distance from the fiber supplying guide of the second guide unit to the central axis of the liner.

2. The filament winding apparatus according to claim 1, wherein the controller adjusts the distance between the fiber supplying guide of each of the first guide unit and the second guide unit and the central axis of the liner while maintaining a difference between the distance from the fiber supplying guide of the first guide unit to the central axis of the liner and the distance from the fiber supplying guide of the second guide unit to the central axis of the liner.

3. The filament winding apparatus according to claim 1, wherein after switching a winding direction of the fiber bundle relative to a direction of the central axis of the liner, the controller performs a switching operation to switch a large-small relationship between the distance from the fiber supplying guide of the first guide unit to the central axis of the liner and the distance from the fiber supplying guide of the second guide unit to the central axis of the liner, in such a way that the distance from the fiber supplying guide of one of the first guide unit and the second guide unit located more on a rear side in the winding direction to the central axis of the liner becomes larger than the distance from the fiber supplying guide of one of the first guide unit and the second guide unit located more on a front side in the winding direction to the central axis of the liner.

4. The filament winding apparatus according to claim 3, wherein the controller performs the switching operation after a winding position of the fiber bundle wound around the liner changes from the front side to the rear side relative to a position of the fiber supplying guide of each of the first guide unit and the second guide unit in the winding direction of the fiber bundle.

5. The filament winding apparatus according to claim 3, wherein
   the liner includes a tubular portion with a constant radius and dome portions disposed respectively on both ends of the tubular portion, and
   the controller performs the switching operation before winding of the fiber bundle on the tubular portion is started.

6. The filament winding apparatus according to claim 5, wherein when the switching operation is performed while the fiber bundle is being wound around one of said dome portions, the controller performs the switching operation when the winding of the fiber bundle around the one of said dome portions is at least half way completed.

* * * * *